(12) United States Patent
Beiler et al.

(10) Patent No.: US 11,865,960 B2
(45) Date of Patent: Jan. 9, 2024

(54) MATERIAL DELIVERY AND WASTE REMOVAL TRAILER

(71) Applicant: New Heights, LLC, Leola, PA (US)

(72) Inventors: Aaron Jay Beiler, Gap, PA (US); Raymond Beiler, New Holland, PA (US); Jeremiah Weaver, Narvon, PA (US)

(73) Assignee: New Heights, LLC, Leola, PA (US)

( * ) Notice: Subject to any disclaimer, the term of this patent is extended or adjusted under 35 U.S.C. 154(b) by 692 days.

(21) Appl. No.: 16/596,858

(22) Filed: Oct. 9, 2019

(65) Prior Publication Data
US 2021/0107389 A1   Apr. 15, 2021

(51) Int. Cl.
| | | |
|---|---|---|
| *B60P 1/16* | (2006.01) | |
| *B60P 1/34* | (2006.01) | |
| *B62D 59/04* | (2006.01) | |
| *B62D 63/08* | (2006.01) | |
| *B62D 63/04* | (2006.01) | |
| *B62D 63/06* | (2006.01) | |

(52) U.S. Cl.
CPC .................. *B60P 1/16* (2013.01); *B60P 1/34* (2013.01); *B62D 59/04* (2013.01); *B62D 63/04* (2013.01); *B62D 63/061* (2013.01); *B62D 63/08* (2013.01); *B62D 63/062* (2013.01)

(58) Field of Classification Search
CPC ...... B60P 1/16; B60P 1/28; B60P 1/30; B60P 1/34; B62D 59/04; B62D 63/04; B62D 63/061; B62D 63/062; B62D 63/08; B66F 7/0675; B66F 7/0683
See application file for complete search history.

(56) References Cited

U.S. PATENT DOCUMENTS

| | | | | |
|---|---|---|---|---|
| 2,775,800 A | * | 1/1957 | Ellms ...................... | B22C 11/00 74/96 |
| 3,902,616 A | * | 9/1975 | Santic .................... | B66F 7/0683 414/420 |
| 4,067,245 A | * | 1/1978 | Santic ...................... | B60P 1/48 74/96 |
| 4,684,314 A | * | 8/1987 | Luth ....................... | E21B 19/14 187/244 |
| 5,218,876 A | * | 6/1993 | Lindsay ............. | F16M 11/2092 396/428 |
| 5,562,390 A | * | 10/1996 | Christenson .............. | B60P 1/20 414/408 |

(Continued)

Primary Examiner — Saul Rodriguez
Assistant Examiner — Ashley K Romano
(74) Attorney, Agent, or Firm — Barley Snyder

(57) ABSTRACT

A material delivery and waste removal trailer that includes a scissors lift mechanism mounted on a main frame of the trailer that elevates a storage bin from the main frame and retracts the storage bin to the main frame. The storage bin has a frame mounted on the scissors lift and a container mounted to the frame of the storage bin. The container of the storage bin is movable pivotally vertically away the frame of the storage bin and linearly horizontally through the frame of the storage bin. A first hydraulic cylinder controls movement of the scissors lift mechanism away from the main frame and toward the main frame and a second hydraulic cylinder controls movement of the container of the storage bin away from the frame of the storage bin and toward and the frame of the storage bin.

26 Claims, 14 Drawing Sheets

(56) References Cited

U.S. PATENT DOCUMENTS

| | | | | |
|---|---|---|---|---|
| 5,836,657 | A * | 11/1998 | Tilley | B60P 1/28 |
| | | | | 410/82 |
| 6,460,653 | B1 * | 10/2002 | Hardy | A01M 31/02 |
| | | | | 182/69.5 |
| 6,789,829 | B1 * | 9/2004 | Kapels | B62D 63/061 |
| | | | | 296/11 |
| 9,340,138 | B2 * | 5/2016 | Piekny | B60P 1/34 |
| 11,131,095 | B2 * | 9/2021 | Beiler | B60P 1/4414 |
| 11,173,824 | B1 * | 11/2021 | Hastings | B60P 1/162 |
| 11,198,384 | B2 * | 12/2021 | Buerkett | B62D 53/02 |
| 2009/0278098 | A1 * | 11/2009 | Bacon | B66F 7/22 |
| | | | | 254/1 |
| 2010/0213754 | A1 * | 8/2010 | Dirr | B60P 1/28 |
| | | | | 298/17 B |
| 2014/0030046 | A1 * | 1/2014 | Perio | E21B 19/155 |
| | | | | 414/22.61 |
| 2015/0063965 | A1 * | 3/2015 | Frizzell | B66F 7/28 |
| | | | | 414/816 |
| 2016/0167558 | A1 * | 6/2016 | Beiler | B60P 1/32 |
| | | | | 414/483 |
| 2018/0290581 | A1 * | 10/2018 | Derstine | B66F 7/00 |
| 2019/0047458 | A1 * | 2/2019 | Hall, Jr. | B60P 1/04 |
| 2019/0070052 | A1 * | 3/2019 | Humbert | A47K 13/105 |
| 2019/0276251 | A1 * | 9/2019 | Clark | B60P 1/025 |
| 2020/0406804 | A1 * | 12/2020 | Jarvis | B60P 1/16 |
| 2022/0041416 | A1 * | 2/2022 | Viola | B66F 7/0625 |

\* cited by examiner

MATERIAL DELIVERY AND WASTE REMOVAL TRAILER

FIELD OF THE INVENTION

The present invention relates, in general, to a material delivery and waste removal trailer and, in particular, to a material delivery and waste removal trailer having a rear extending storage bin.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the around the building and then workers manually pick up debris to deposit it into a disposal container. Even if the material can be thrown directly into a container, there remain the problems of getting the disposal container in proximity to the roof and removal from the roof site.

The most common solution to the disposal problem is to move the dump truck adjacent to the building and to attempt to throw the material directly from the roof into the truck bin. Furthermore, the problem is not limited to roofing material. Many building remodeling generate significant construction trash and the most convenient method of removing it from the building is to throw it out a window. It is not always possible to move a large truck into a location adjacent to a building. Fences, lawns, and shrubs can be damaged by the truck, especially a large transport truck.

SUMMARY

A material delivery and waste removal trailer, constructed in accordance with the present invention, includes a main frame, a scissors lift mechanism mounted on the main frame, and a storage bin. The storage bin has a frame mounted on the scissors lift and a container mounted to the frame of the storage bin. The container of the storage bin is movable pivotally vertically away the frame of the storage bin and linearly horizontally through the frame of the storage bin. A material delivery and waste removal trailer, constructed in accordance with the present invention, also includes a first hydraulic cylinder that extends between the main frame and the scissors lift mechanism and controls movement of the scissors lift mechanism away from the main frame and toward the main frame. A material delivery and waste removal trailer, constructed in accordance with the present invention, further includes a second hydraulic cylinder that extends between the frame of the storage bin and the container of the storage bin and controls movement of the container of the storage bin away from the frame of the storage bin and toward and the frame of the storage bin. A material delivery and waste removal trailer, constructed in accordance with the present invention, also includes a control system selectively activating and deactivating the first hydraulic cylinder and the second hydraulic cylinder.

BRIEF DESCRIPTION OF THE DRAWINGS

A more complete understanding of the present invention may be derived by referring to the detailed description when considered in connection with the accompanying illustrative figures. In the figures, like reference numbers refer to like elements or acts throughout the figure

DETAILED DESCRIPTION OF THE PRESENT INVENTION

Figure 1:
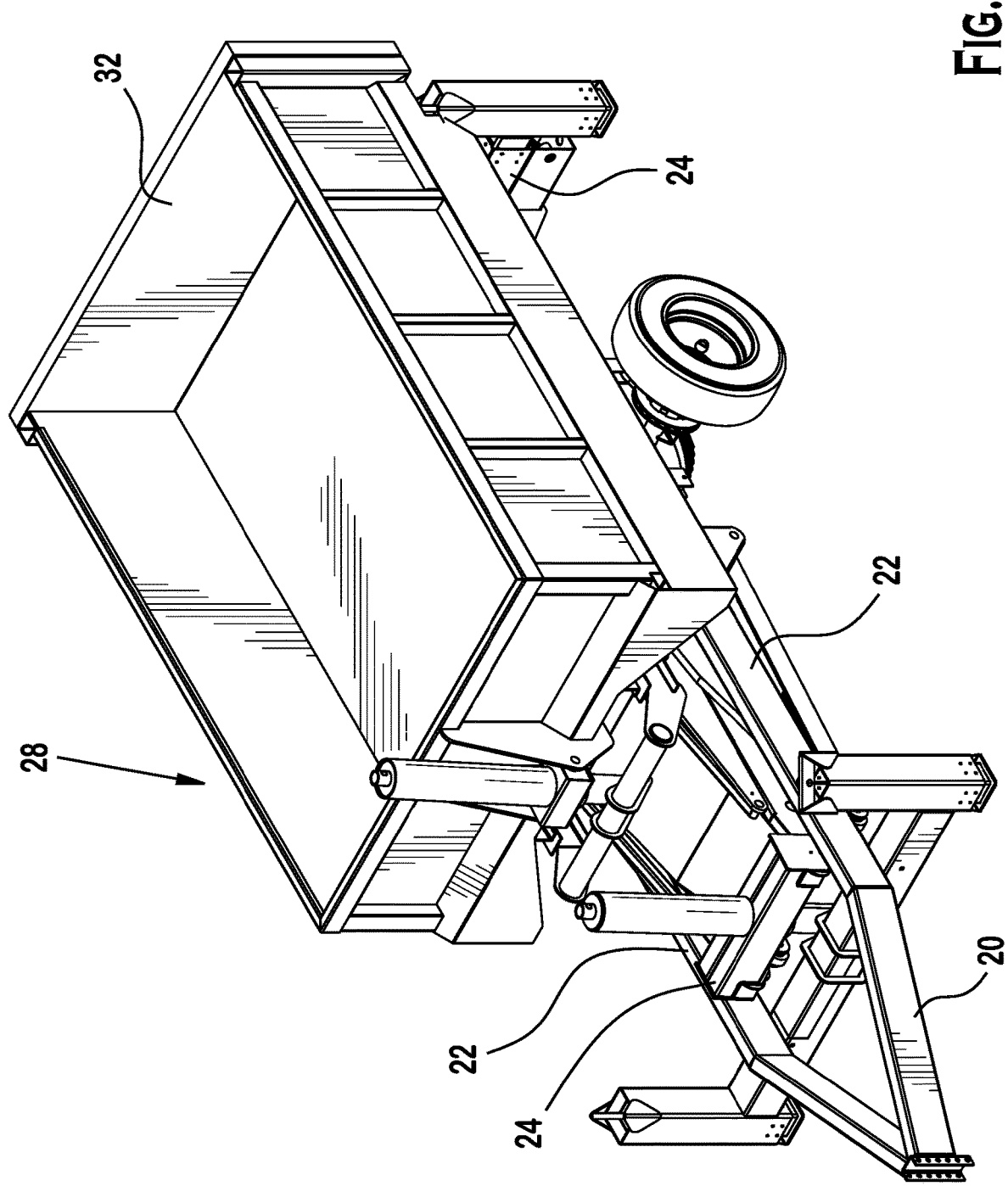
FIG. 1 is a perspective view of a material delivery and waste removal trailer constructed in accordance with the present invention with the storage bin in a retracted position.

Referring to the drawings, a material delivery and waste removal trailer, constructed in accordance with the present invention, includes a main frame 20 which has, for the embodiment of the present invention illustrated and being described, support beams 22 and connecting beams 24 extending substantially perpendicular to and connecting the support beams 22. Main frame 20 can have a construction generally similar to frame 10 in U.S. Pat. No. 10,017,091.

A material delivery and waste removal trailer, constructed in accordance with the present invention, also includes a scissors lift mechanism 26, of conventional construction and operation, mounted on main frame 20. Scissors link mechanism 26 has a plurality rigid line segments 26a, 26b, 26c with a number of the rigid line segments pivotally linked together by hinged intersections 26d, 26e.

A material delivery and waste removal trailer, constructed in accordance with the present invention, further includes a storage bin 28 which has a frame 30 mounted on scissors lift 26 and a container 32 mounted to frame 30 of storage bin 28. Container 32 of storage bin 28 is pivotally mounted to frame 30 of storage bin 28 at a first end 30a of frame 30 of storage bin. 28. Container 32 is movable pivotally vertically away frame 30 of storage 28 bin and back to frame 30 of the storage bin as indicated by arrow 34 and linearly horizontally through frame 30 of storage bin 28 as indicated by arrows 36 as shown in FIGS. 5, 6, 7, 8, 9, and 10.

Figure 5:
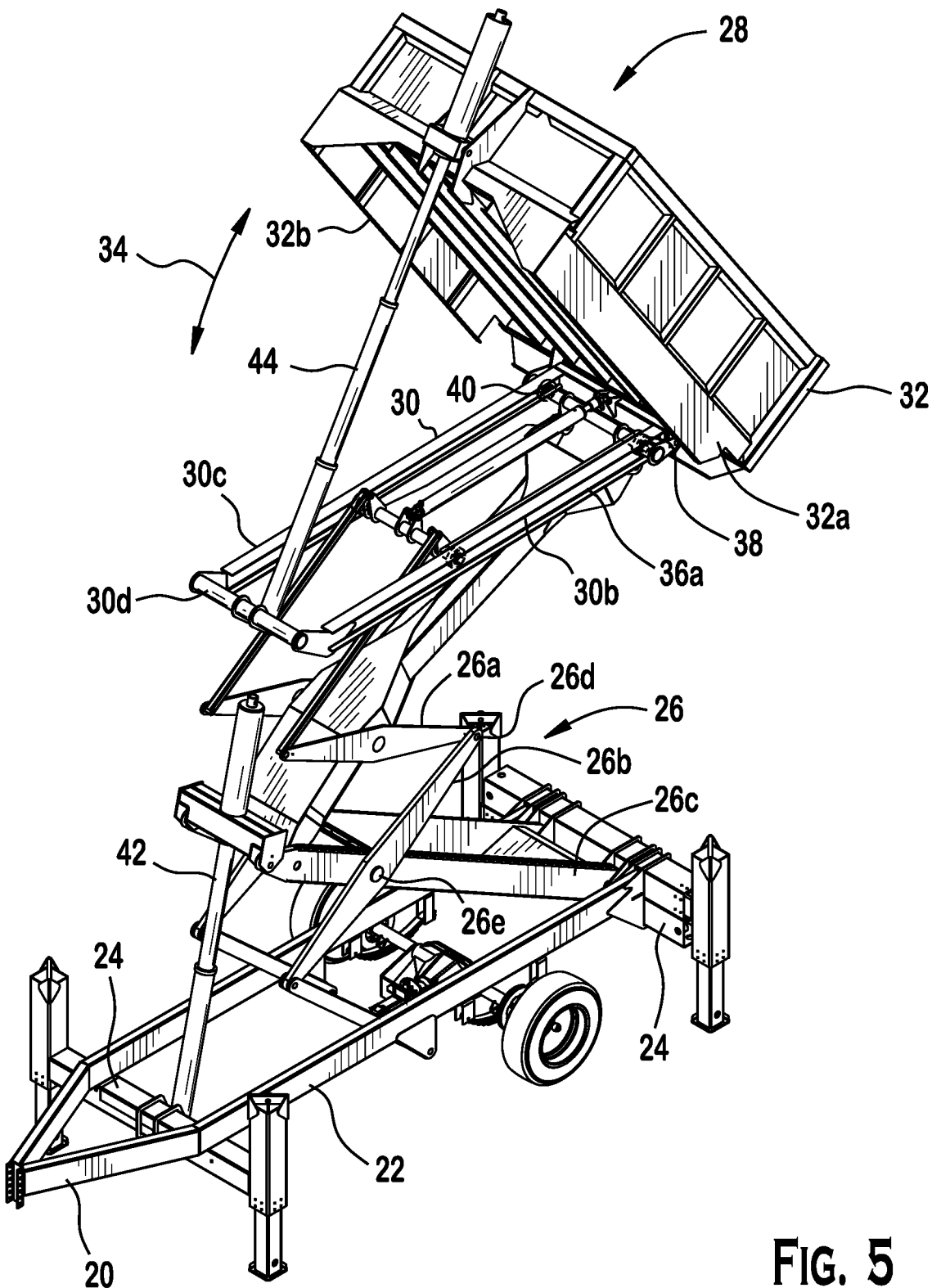
FIG. 5 is a perspective view of the material delivery and waste removal trailer of FIGS. 1 and 2 with the storage bin elevated and the container of the storage bin pivoted vertically away from the frame of the storage bin.

As shown most clearly in FIGS. 5, 9, 12, 13, and 14, frame 30 of storage bin 28 has a first side rail 30b and a second side rail 30c. A first side 32a of container 32 of storage bin 28 has a first roller 38 that is movable in first side rail 30a of the of frame 30 of the storage bin 28 and a second side 32b of container 32 of storage bin 28 has a second roller 40, as shown in FIG. 5, that is movable in second side rail 30c of frame 30 of the storage bin 28.

A material delivery and waste removal trailer, constructed in accordance with the present invention, further includes a first hydraulic cylinder 42 extending between main frame 20 and the scissors lift mechanism 26. First hydraulic cylinder 42 controls movement of the scissors lift mechanism away from main frame 20 and toward main frame 20.

A material delivery and waste removal trailer, constructed in accordance with the present invention, further includes a second hydraulic cylinder 44 extending between end 30d of frame 30 of storage bin 30 and container 32 of storage bin 28. Second hydraulic cylinder 44 controls movement of storage bin 28 away from frame 30 of storage bin 28 and toward and frame 30 of storage bin 28.

Figure 2:
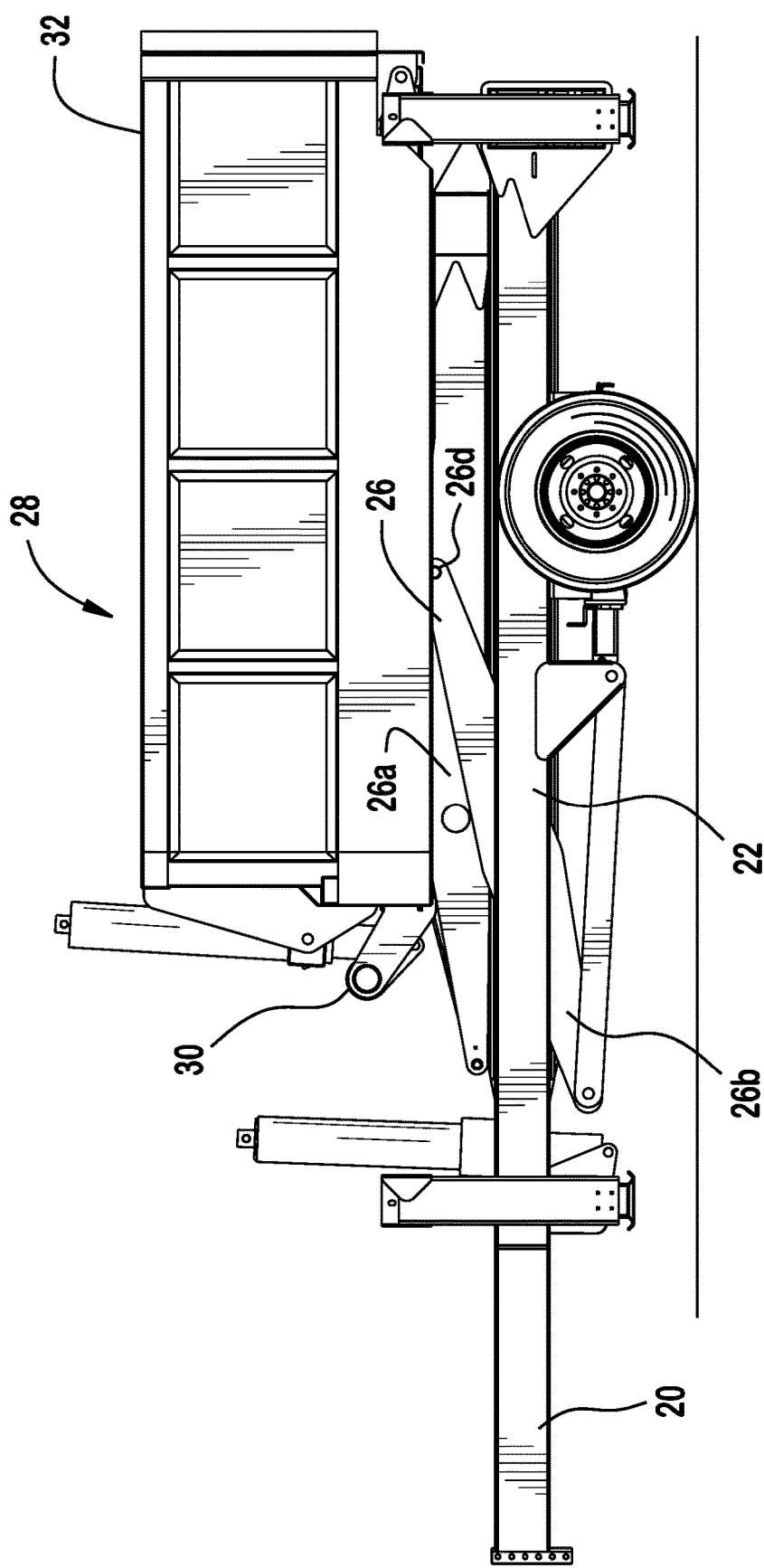
FIG. 2 is a side view of the material delivery and waste removal trailer of FIG. 1 with the storage bin in a retracted position.
Figure 15:
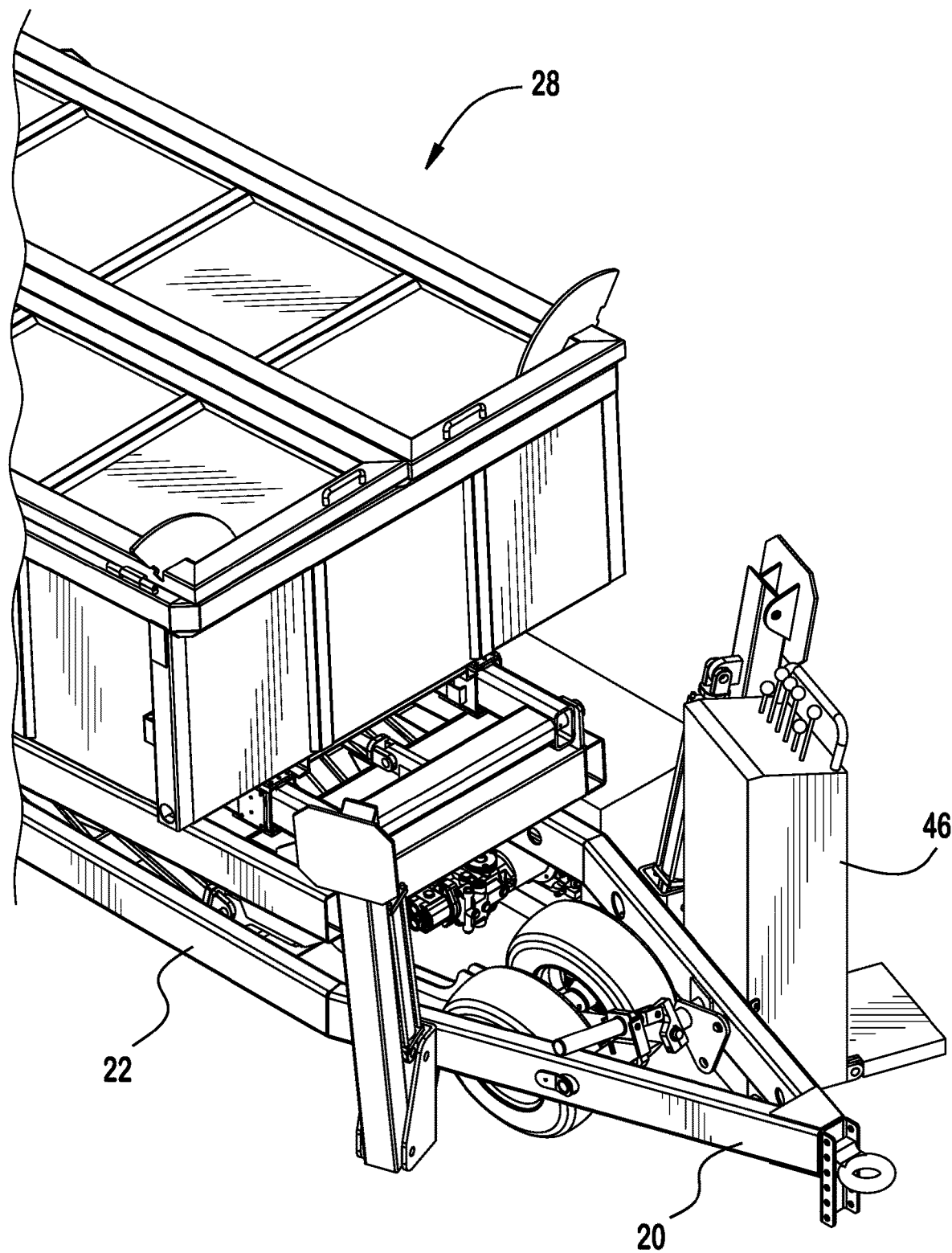
FIG. 15 is a perspective view another material delivery and waste removal trailer constructed in accordance with the present invention with the storage bin in a retracted position and which is generally similar to the material delivery and waste removal trailer of FIGS. 1 and 2.

FIG. 15 is a perspective view of a material delivery and waste removal trailer, with the storage bin in a retracted position, constructed in accordance with the present invention and generally similar to the material delivery and waste removal trailer of FIGS. 1 and 2. First hydraulic cylinder 42 and second hydraulic cylinder 44 can be controlled by a control system 46, such as the one described and illustrated in U.S. Pat. No. 10,017,091. More specifically, control system 46 selectively activates and deactivates first hydraulic cylinder 42 to elevate or lower storage bin 28 and selectively activates and deactivates second hydraulic cylinder 44 to pivot vertically container 32 of the storage bin away from or back to frame 30 of the storage bin and move the container of the storage bin to move horizontally through the frame of the storage bin.

Control system 46 can be connected physically to first hydraulic cylinder 42 and second hydraulic cylinder 44 to control activation and deactivation of the two hydraulic cylinders or control system 46 can be arranged to activate or deactivate the two hydraulic cylinders wirelessly.

The following describes the various positions a material delivery and waste removal trailer, constructed in accordance with the present invention, can take and the particular functions that can be fulfilled at the various positions.

FIGS. 1 and 2 show scissors lift mechanism 26 compressed with storage bin 28 in a retracted position at which new material can be loaded into container 32 of the storage bin or waste material in the container of the storage bin can be unloaded.

Figure 3:
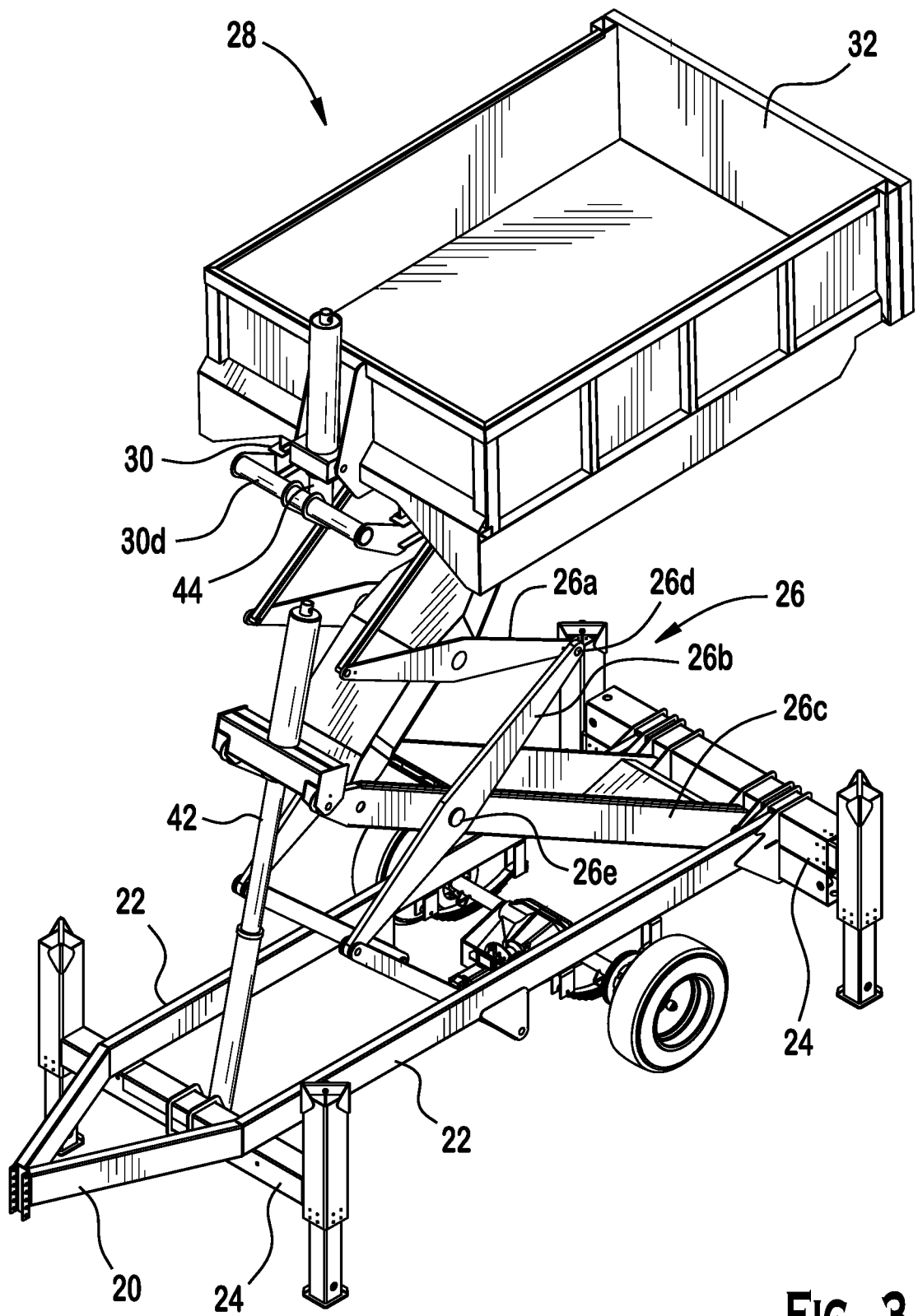
FIG. 3 is a perspective view of the material delivery and waste removal trailer of FIGS. 1 and 2 with the storage bin elevated.
Figure 4:
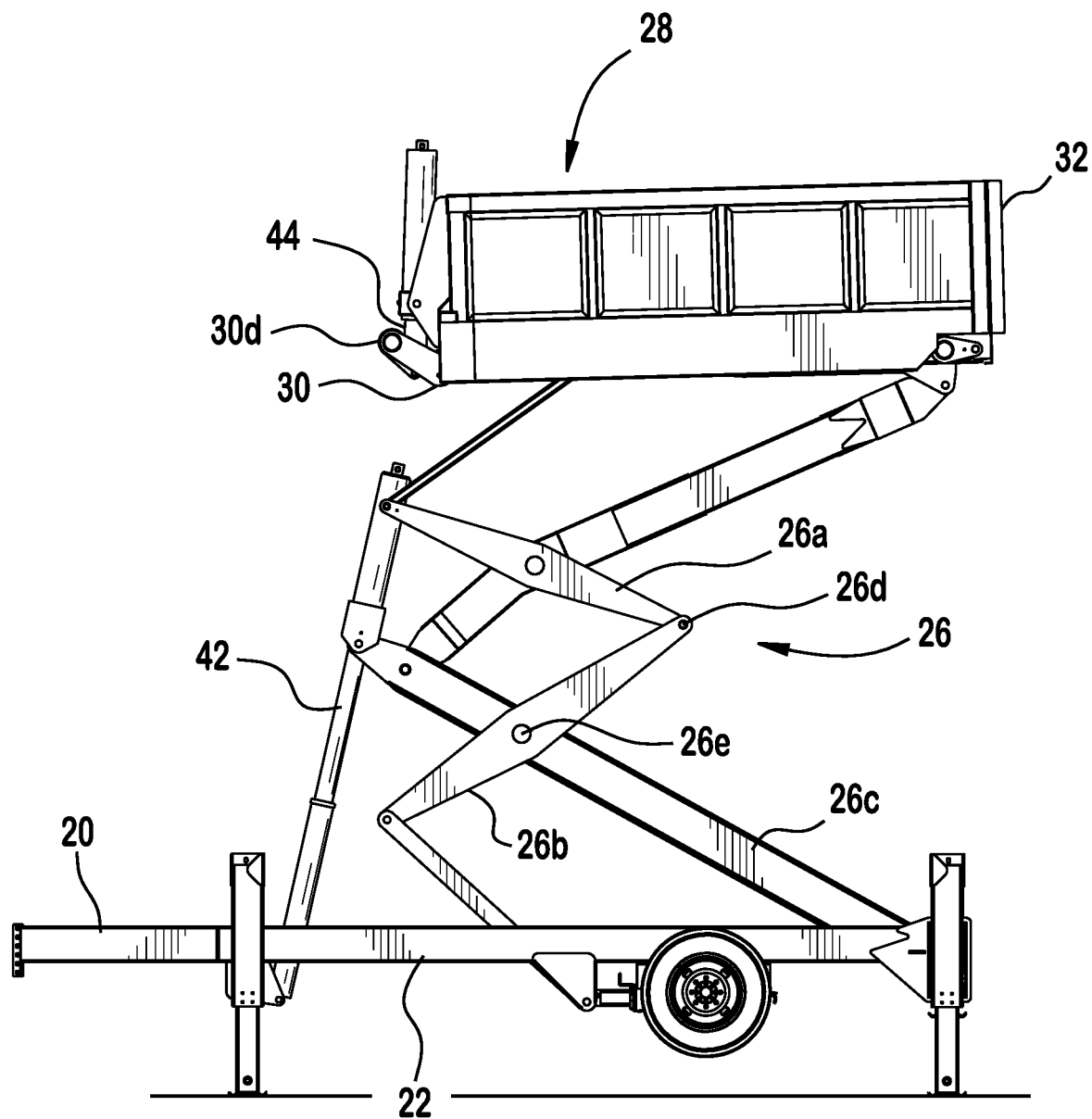
FIG. 4 is a side view of the material delivery and waste removal trailer of FIGS. 1 and 2 with the storage bin elevated.

FIGS. 3 and 4 show scissors lift mechanism 26 expanded with storage bin 28 in an elevated position at which new material can be unloaded from container 32 of the storage bin or waste material can to be loaded into the container of the storage bin.

Figure 6:
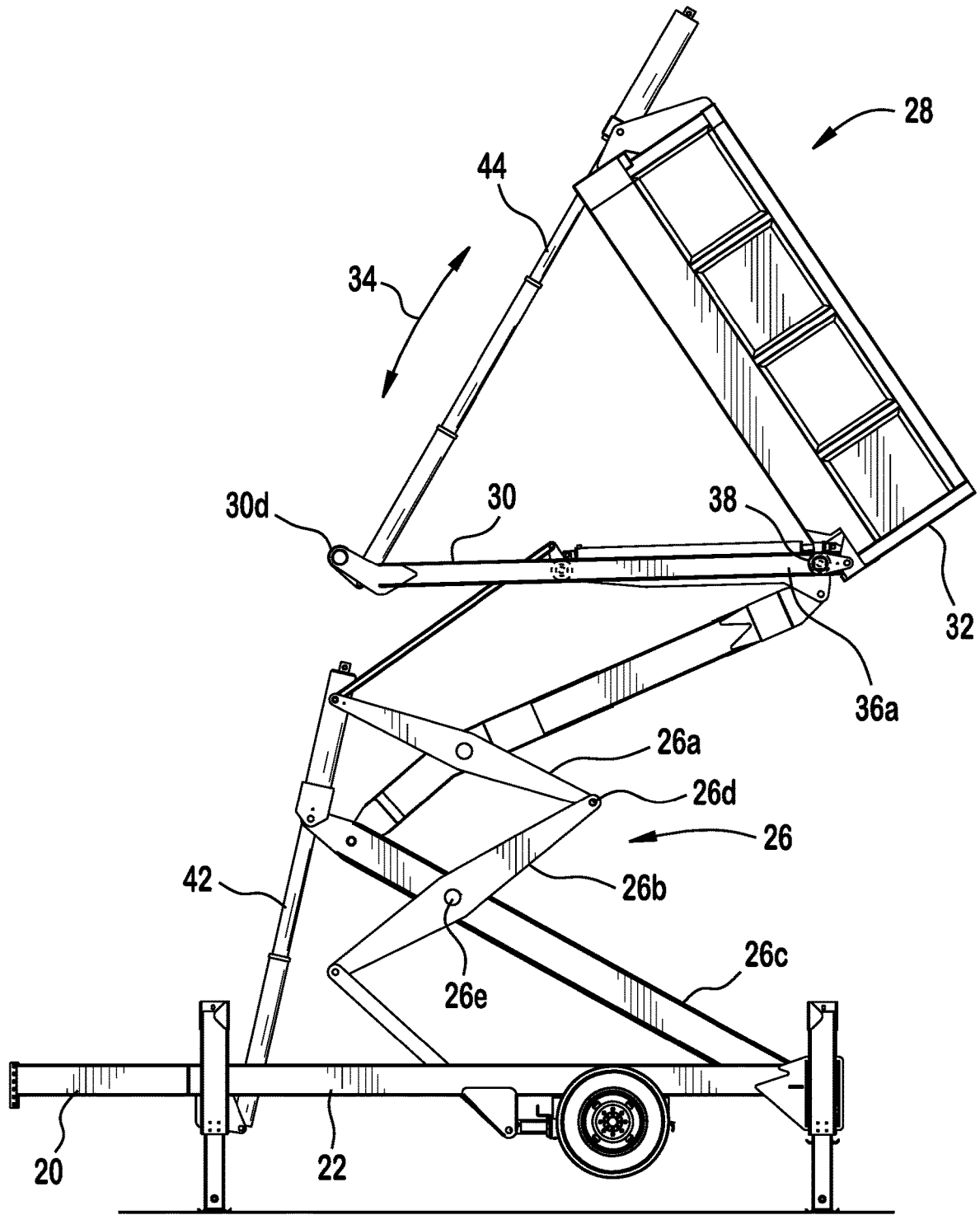
FIG. 6 is a side view of the material delivery and waste removal trailer of FIGS. 1 and 2 with the storage bin elevated and the container of the storage bin pivoted vertically away from the frame of the storage bin.

FIGS. 5 and 6 show scissors lift mechanism 26 expanded with storage bin 28 in an elevated position with container 32 of the storage bin pivoted vertically away from frame 30 of the storage bin at which new material can be unloaded from the container of the storage bin or waste material can to be loaded into the container of the storage bin.

Figure 7:
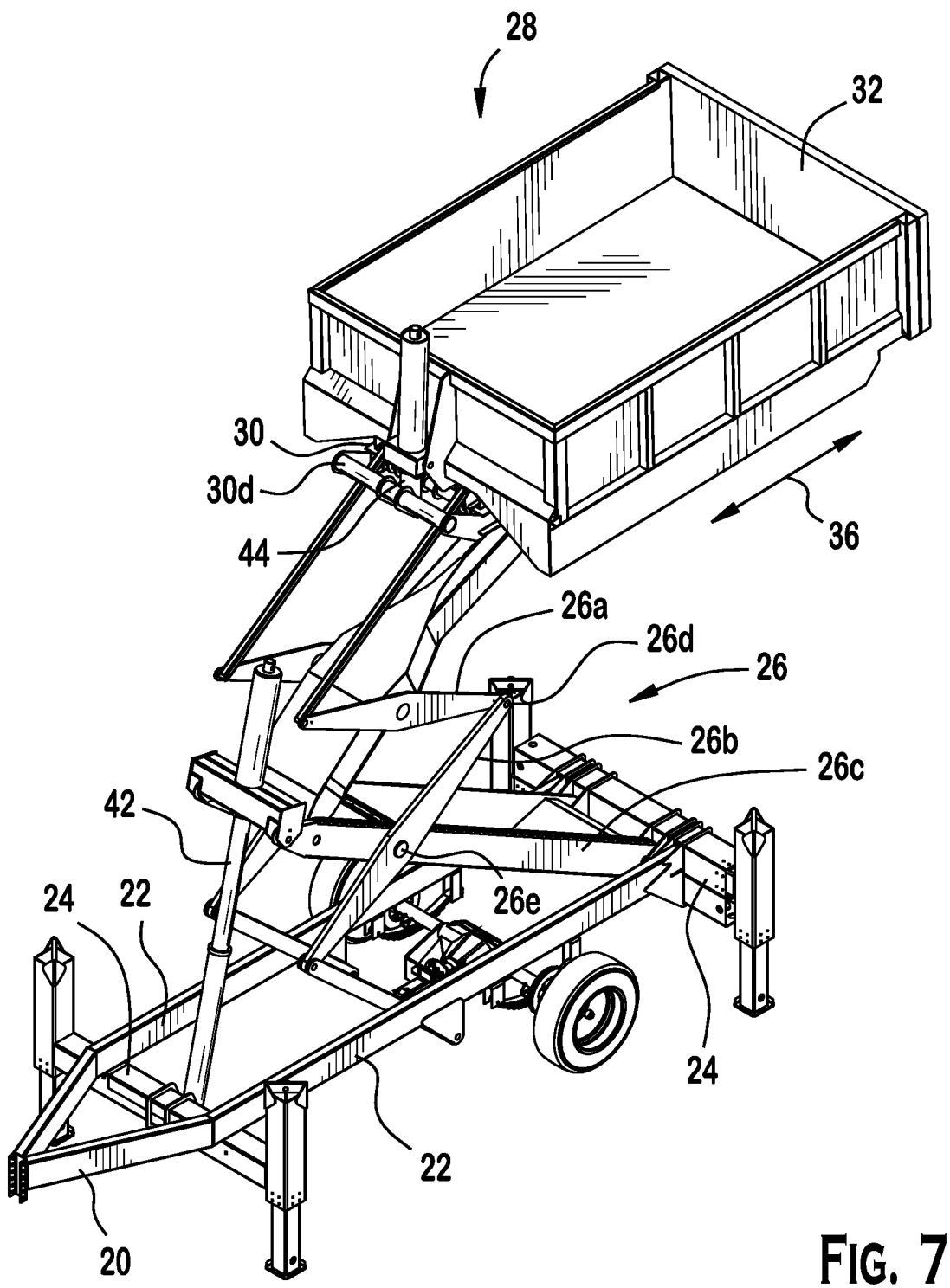
FIG. 7 is a perspective view of the material delivery and waste removal trailer of FIGS. 1 and 2 with the storage bin elevated and the container of the storage bin moved linearly horizontally through the frame of the storage bin.
Figure 8:
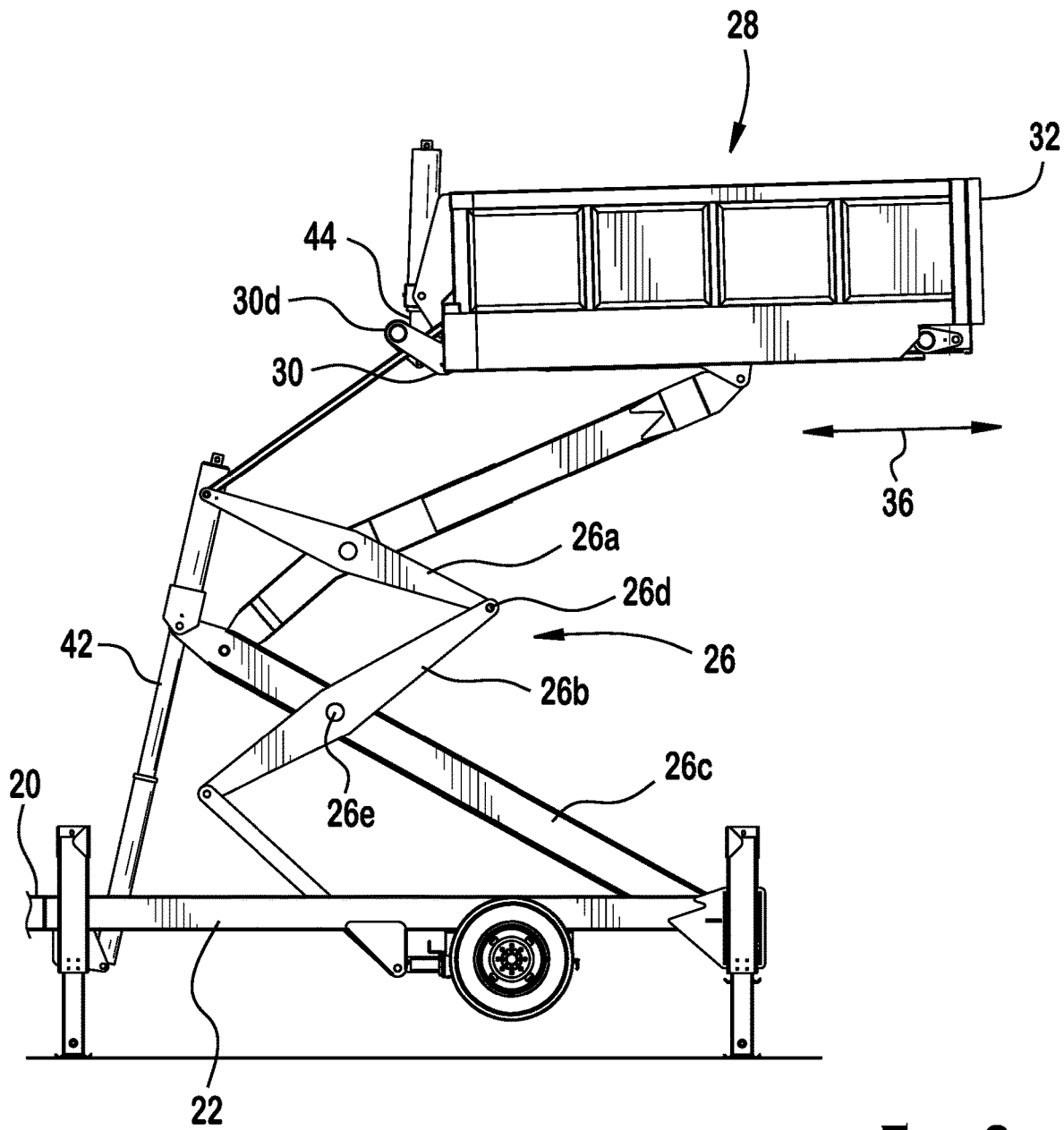
FIG. 8 is a side view of the material delivery and waste removal trailer of FIGS. 1 and 2 with the storage bin elevated and the container of the storage bin moved linearly horizontally through the frame of the storage bin.
Figure 9:
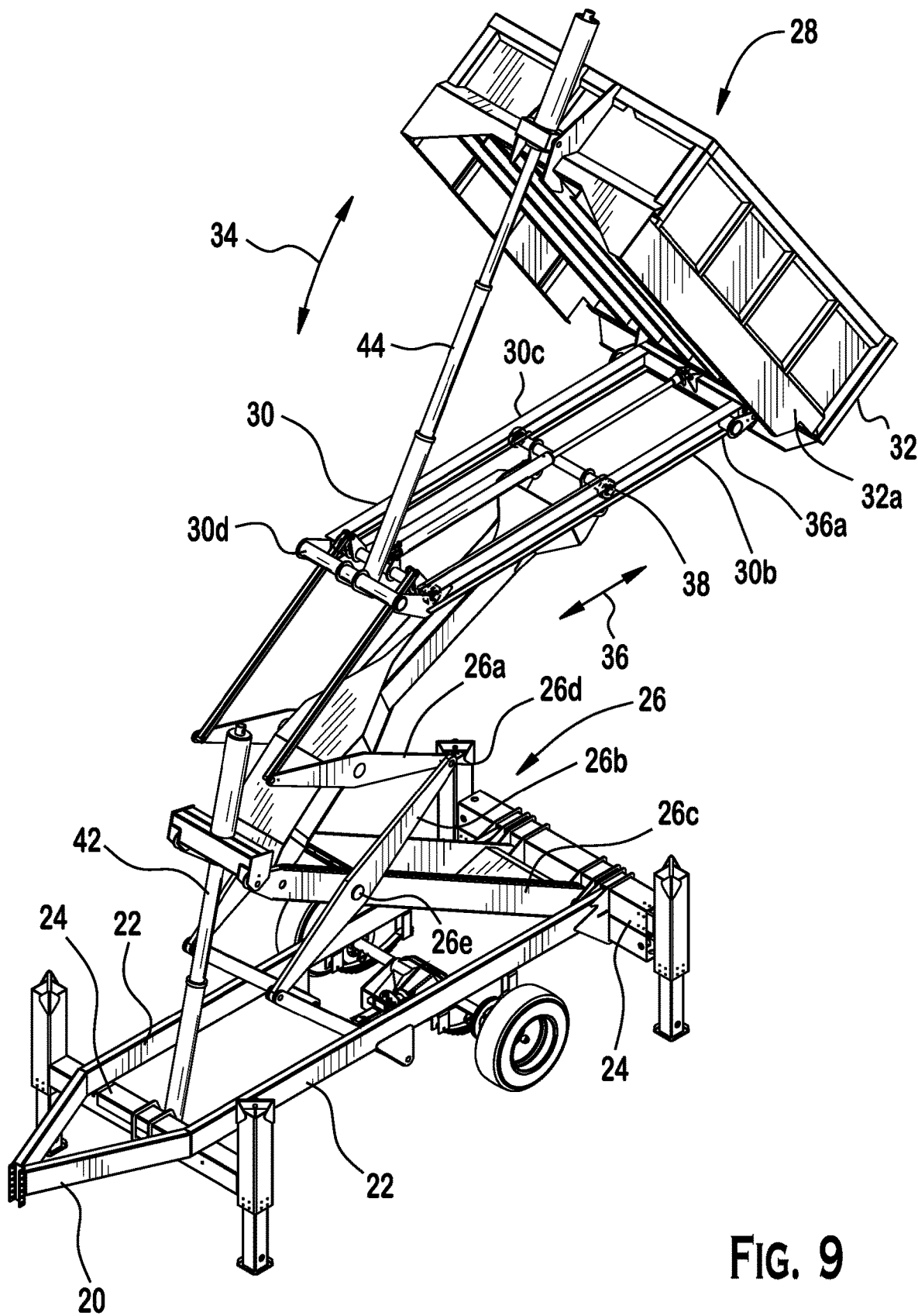
FIG. 9 is a perspective view of the material delivery and waste removal trailer of FIGS. 1 and 2 with the storage bin elevated and the container of the storage bin pivoted vertically away from the frame of the storage bin and moved linearly horizontally through the frame of the storage bin.
Figure 10:
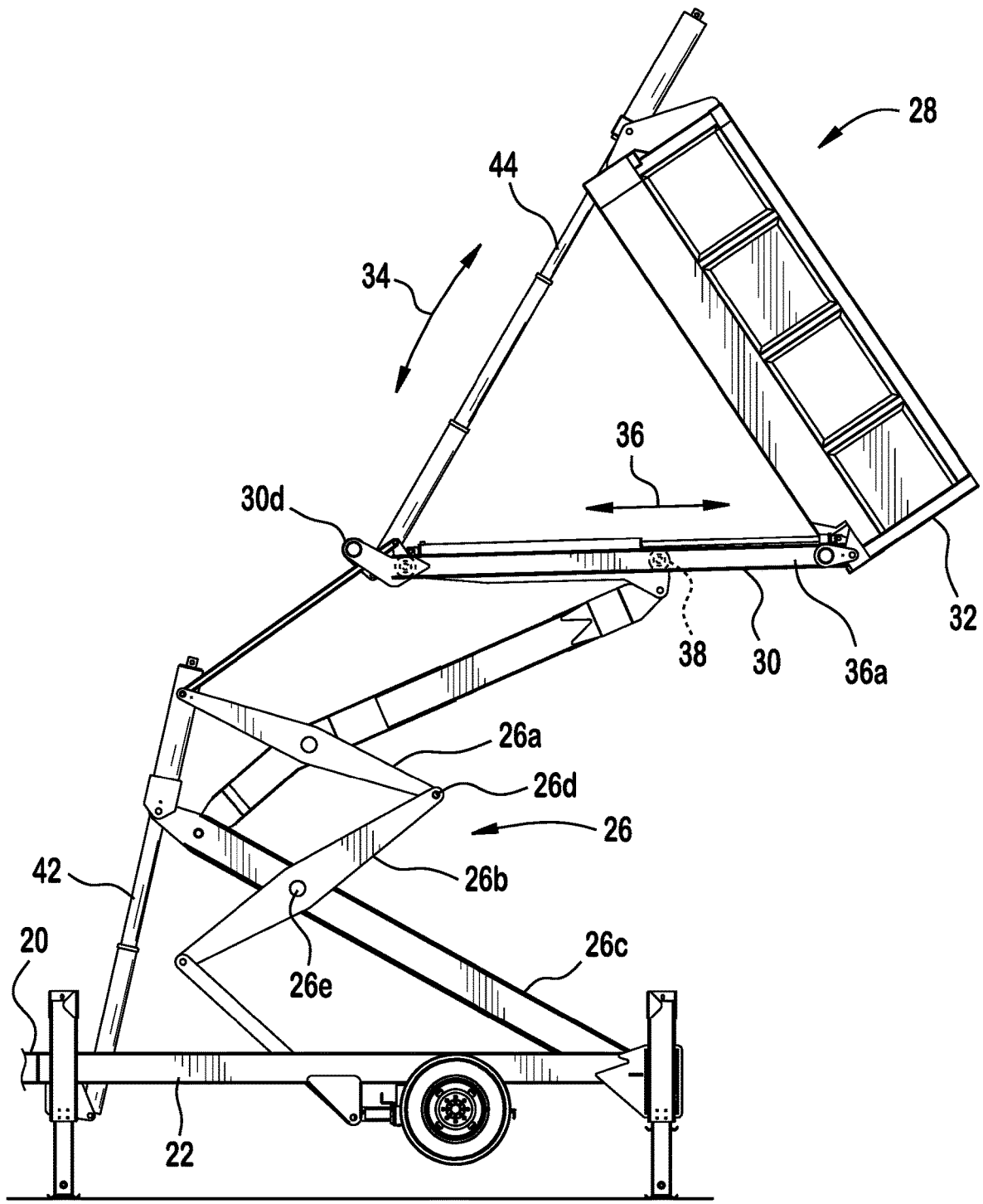
FIG. 10 is a side view of the material delivery and waste removal trailer of FIGS. 1 and 2 with the storage bin elevated and the container of the storage bin pivoted vertically away from the frame of the storage bin and moved linearly horizontally through the frame of the storage bin.
Figure 11:
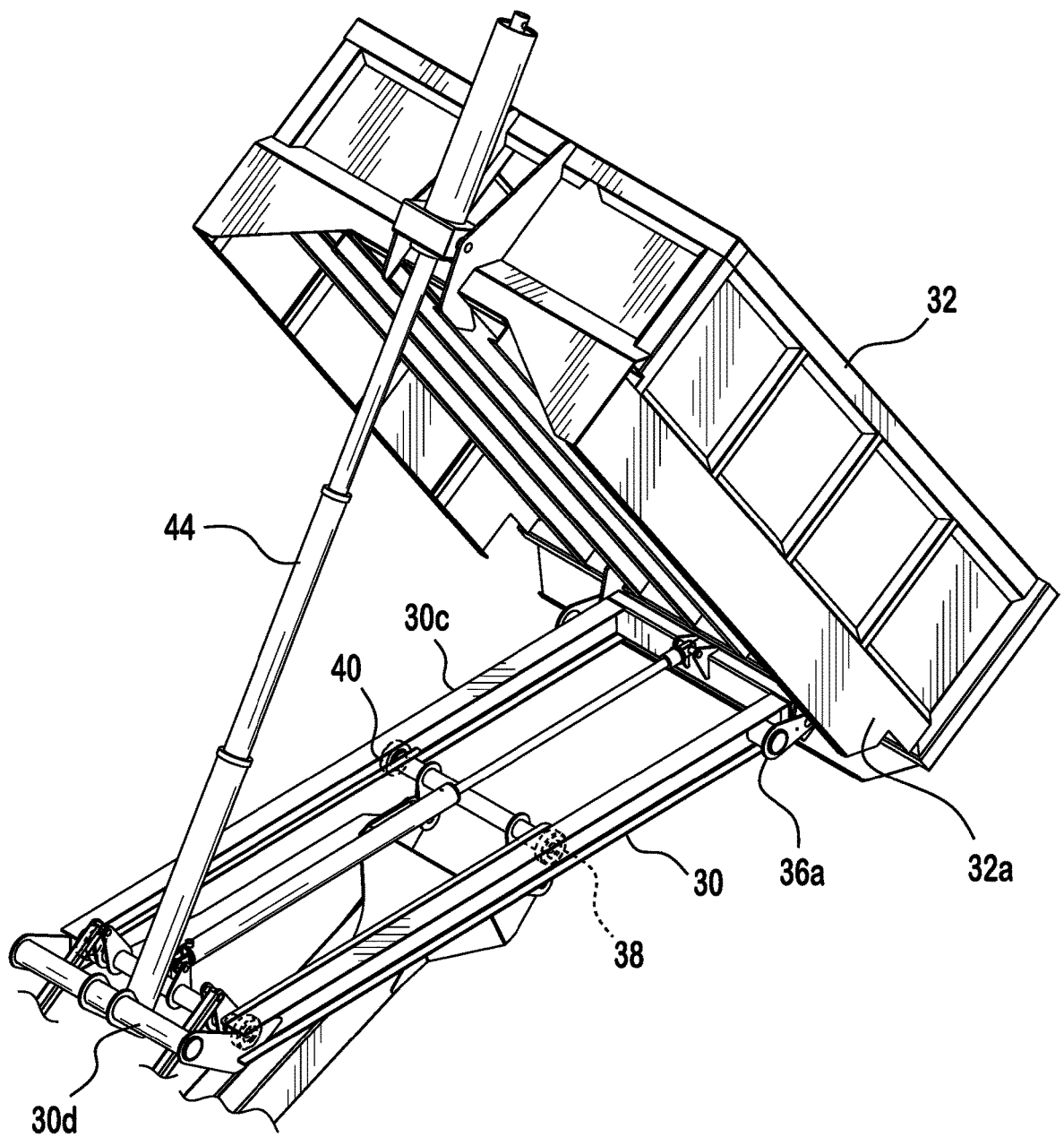
FIG. 11 is a perspective view, on an enlarged scale, of a portion of the storage bin of the material delivery and waste removal trailer of FIGS. 1 and 2.
Figure 12:
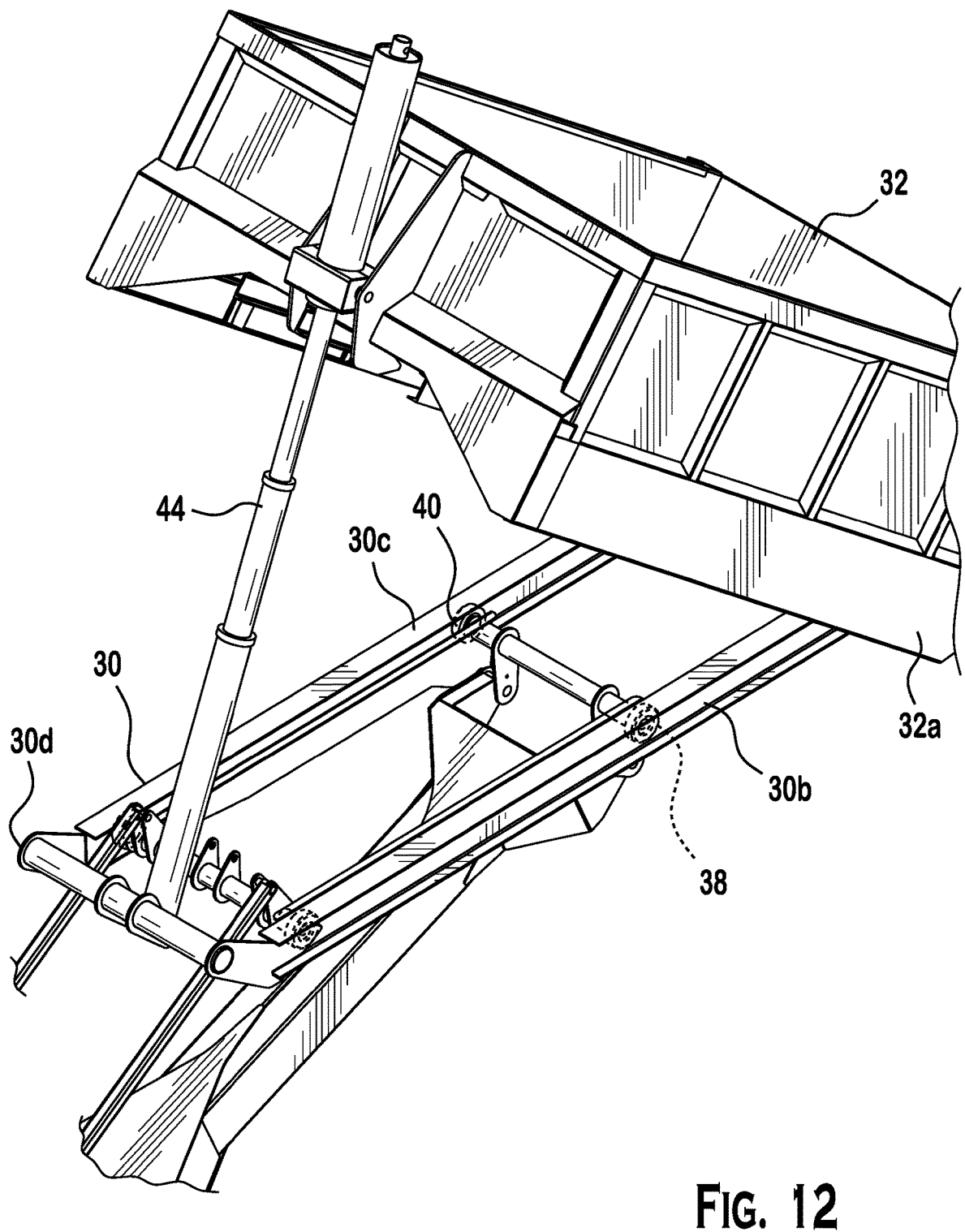
FIG. 12 is a perspective view, on an enlarged scale, of a portion of the storage bin of the material delivery and waste removal trailer of FIGS. 1 and 2.
Figure 13:
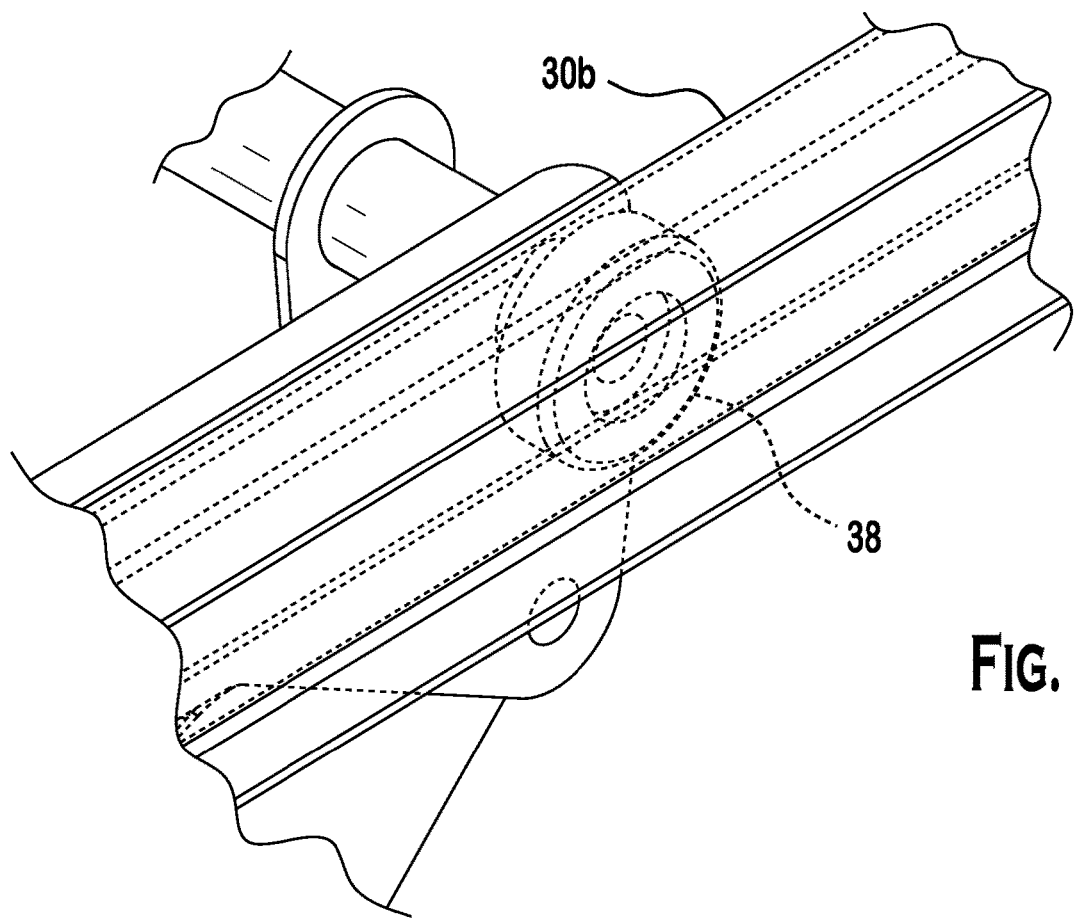
FIG. 13 is another perspective view, on an enlarged scale, of a portion of the storage bin of the material delivery and waste removal trailer of FIGS. 1 and 2.
Figure 14:
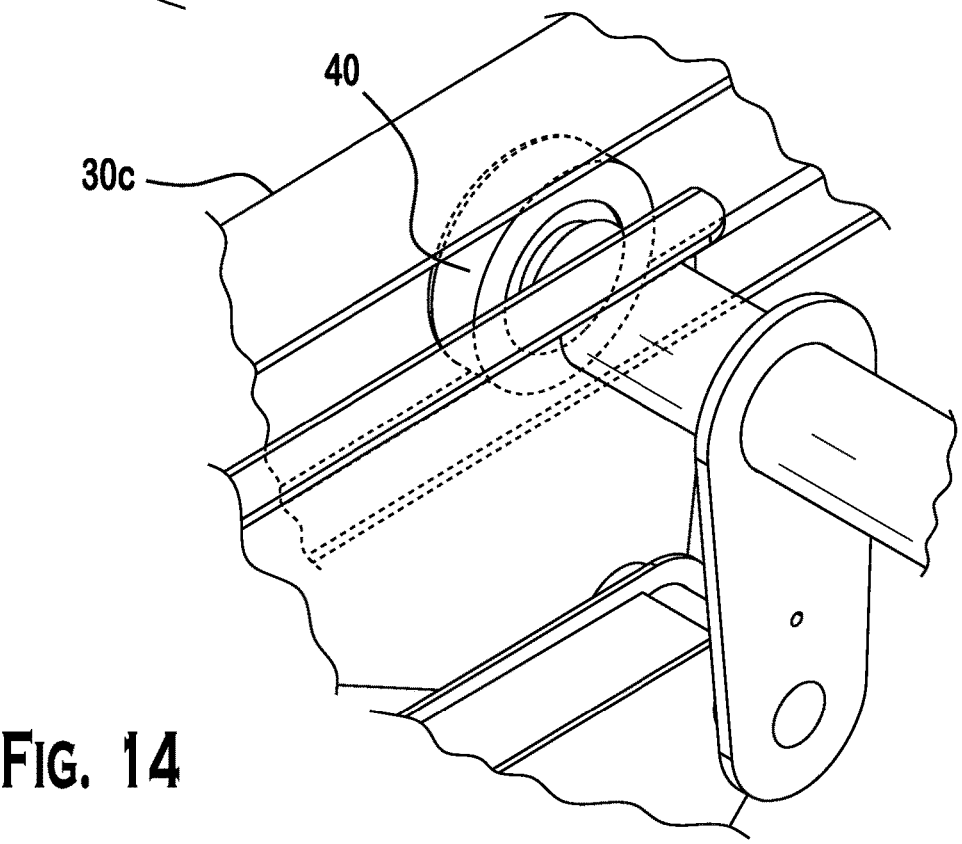
FIG. 14 is another perspective view, on an enlarged scale, of a portion of the storage bin of the material delivery and waste removal trailer of FIGS. 1 and 2.

FIGS. 7 and 8 show scissors lift mechanism 26 expanded with storage bin 28 in an elevated position and container 32 of the storage bin moved linearly horizontally through frame 30 of the storage bin at which new material can be unloaded from the container of the storage bin or waste material can to be loaded into the container of the storage bin FIGS. 9 and 10 show scissors lift mechanism expanded with storage bin 28 in an elevated position and container 32 of the storage bin pivoted vertically away from frame 30 of the storage bin and moved linearly horizontally through the frame of the storage bin at which new material can be unloaded from the container of the storage bin or waste material can to be loaded into the container of the storage bin.

The foregoing illustrates some of the possibilities for practicing the present invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:
1. A material delivery and waste removal trailer comprising:
   a main frame;
   a scissors lift mechanism mounted on the main frame;
   a storage bin having:
     (a) a frame mounted on the scissors lift, and
     (b) a container mounted to outer opposing sides of the frame of the storage bin and movable:
       (1) pivotally vertically away from the frame of the storage bin, and
       (2) linearly horizontally along the frame of the storage bin;
   a first hydraulic cylinder:
     (a) extending between the main frame and the scissors lift mechanism, and
     (b) controlling movement of the scissors lift mechanism away from the main frame and toward the main frame;
   a second hydraulic cylinder:
     (a) extending between the frame of the storage bin and the container of the storage bin, and
     (b) controlling movement of the container of the storage bin away from the frame of the storage bin and toward the frame of the storage bin; and
   a control system selectively activating and deactivating the first hydraulic cylinder and the second hydraulic cylinder.

2. The material delivery and waste removal trailer according to claim 1, wherein the frame of the storage bin includes a first side rail and a second side rail opposite the first side rail.

3. The material delivery and waste removal trailer according to claim 2, further comprising a first roller positioned along a first side of the container of the storage bin and movable in the first side rail of the frame of the storage bin.

4. The material delivery and waste removal trailer according to claim 3, further comprising a second roller positioned along a second side of the container of the storage bin and movable in the second side rail of the frame of the storage bin.

5. The material delivery and waste removal trailer according to claim 4, wherein the container of the storage bin is pivotally mounted to the frame of the storage bin at a first end of the frame of the storage bin.

6. The material delivery and waste removal trailer according to claim 5, wherein the second hydraulic cylinder extends between the container of the storage bin and a second end of the frame of the storage bin opposite from the end of the frame of the storage bin at which the container of the storage bin is pivotally mounted to the frame of the storage bin.

7. The material delivery and waste removal trailer according to claim 6, wherein the first hydraulic cylinder extends between the main frame and a selected line segment of a plurality of rigid line segments in the scissors lift mechanism.

8. The material delivery and waste removal trailer according to claim 1, wherein the scissors link mechanism has a plurality of rigid line segments, any two of which are pivotally linked together by a hinged intersection.

9. The material delivery and waste removal trailer according to claim 8, wherein the first hydraulic cylinder extends between the main frame and a selected hinged intersection in the scissors lift mechanism.

10. The material delivery and waste removal trailer according to claim 9, wherein the frame of the storage bin includes a first side rail and a second side rail opposite the first side rail.

11. The material delivery and waste removal trailer according to claim 10, further comprising a first roller positioned along a first side of the container of the storage bin and movable in the first side rail of the frame of the storage bin.

12. The material delivery and waste removal trailer according to claim 11, further comprising a second roller positioned along a second side of the container of the storage bin and movable in the second side rail of the frame of the storage bin.

13. The material delivery and waste removal trailer according to claim 1, wherein a portion of the second hydraulic cylinder is above the container.

14. A material delivery and waste removal trailer comprising:
   a self-propelled main frame having drive wheels and a steerable wheel;
   a lift mechanism mounted on the main frame;
   a storage bin having:
      (a) a storage frame mounted on a scissors lift, and
      (b) a container secured to the storage frame and movable linearly horizontally along the storage frame;
   a first hydraulic cylinder:
      (c) extending between the main frame and the scissors lift mechanism, and
      (d) controlling movement of the lift mechanism away from the main frame and toward the main frame;
   a second hydraulic cylinder:
      (c) extending between an end of the storage frame and an end of the container, and
      (d) controlling movement of the container toward and away from the storage frame; and
   a control system selectively activating and deactivating the first hydraulic cylinder and the second hydraulic cylinder.

15. The material delivery and waste removal trailer according to claim 14, wherein the storage frame includes a first side rail and a second side rail opposite the first side rail.

16. The material delivery and waste removal trailer according to claim 15, further comprising a first roller positioned along a first side of the container and movable in the first side rail of the storage frame.

17. The material delivery and waste removal trailer according to claim 16, further comprising a second roller positioned along a second side of the container and movable in the second side rail of the storage frame.

18. The material delivery and waste removal trailer according to claim 17, wherein the container is pivotally mounted to the storage frame at a first end thereof and is movable pivotally vertically away the storage frame.

19. The material delivery and waste removal trailer according to claim 18, wherein the second hydraulic cylinder extends between the container and a second end of the storage frame opposite from the end of the storage frame at which the container is pivotally mounted to the storage frame.

20. The material delivery and waste removal trailer according to claim 19, wherein the first hydraulic cylinder extends between the main frame and a selected line segment in the lift mechanism.

21. The material delivery and waste removal trailer according to claim 14, wherein the lift mechanism is a scissors link mechanism having a plurality rigid line segments, any two of which are pivotally linked together by a hinged intersection.

22. The material delivery and waste removal trailer according to claim 21, wherein the first hydraulic cylinder extends between the main frame and a selected hinged intersection in the lift mechanism.

23. The material delivery and waste removal trailer according to claim 22, wherein the storage frame includes a first side rail and a second side rail opposite the first side rail.

24. The material delivery and waste removal trailer according to claim 23, further comprising a first roller positioned along a first side of the container and movable in the first side rail of the storage frame.

25. The material delivery and waste removal trailer according to claim 24, further comprising a second roller positioned along a second side of the container and movable in the second side rail of the storage frame.

26. The material delivery and waste removal trailer according to claim 14, wherein a portion of the second hydraulic cylinder is above the container.

* * * * *